US010404709B2

United States Patent
Borkowicz et al.

(10) Patent No.: US 10,404,709 B2
(45) Date of Patent: Sep. 3, 2019

(54) SECURITY GATEWAY MODULE FOR ON-BOARD DIAGNOSTICS PORT OF A VEHICLE

(71) Applicants: Neil L Borkowicz, Plymouth, MI (US); William Mazzara, Waterford, MI (US)

(72) Inventors: Neil L Borkowicz, Plymouth, MI (US); William Mazzara, Waterford, MI (US)

(73) Assignee: FCA US LLC, Auburn Hills, MI (US)

( * ) Notice: Subject to any disclaimer, the term of this patent is extended or adjusted under 35 U.S.C. 154(b) by 277 days.

(21) Appl. No.: 15/428,682

(22) Filed: Feb. 9, 2017

(65) Prior Publication Data

US 2018/0227306 A1 Aug. 9, 2018

(51) Int. Cl.
| | | |
|---|---|---|
| *G07C 5/08* | (2006.01) | |
| *H04W 4/48* | (2018.01) | |
| *H04L 12/40* | (2006.01) | |
| *H04L 12/66* | (2006.01) | |
| *H04L 29/06* | (2006.01) | |

(52) U.S. Cl.
CPC ............. *H04L 63/101* (2013.01); *G07C 5/08* (2013.01); *H04L 12/40006* (2013.01); *H04L 12/40013* (2013.01); *H04L 12/66* (2013.01); *H04L 63/0227* (2013.01); *H04W 4/48* (2018.02); *H04L 2012/40215* (2013.01); *H04L 2012/40273* (2013.01)

(58) Field of Classification Search
CPC . H04L 63/101; H04L 12/66; H04L 12/40013; H04L 63/0227; H04L 12/40006; H04L 2012/40215; H04L 2012/40273; H04W 4/48; G06C 5/08
USPC ............................................................ 726/4
See application file for complete search history.

(56) References Cited

U.S. PATENT DOCUMENTS

| | | | |
|---|---|---|---|
| 10,124,750 B2* | 11/2018 | Markham | ............... H04W 4/40 |
| 2015/0020152 A1 | 1/2015 | Litichever et al. | |
| 2015/0113638 A1 | 4/2015 | Valasek et al. | |
| 2015/0135271 A1 | 5/2015 | Forest | |
| 2015/0191136 A1 | 7/2015 | Ben et al. | |
| 2016/0021127 A1 | 1/2016 | Yan et al. | |
| 2016/0381068 A1* | 12/2016 | Galula | ................. H04L 63/123 726/23 |
| 2017/0126711 A1* | 5/2017 | Jung | ..................... G05B 15/02 |

OTHER PUBLICATIONS

International Search Report and Written Option dated May 28, 2018 for International Application No. PCT/US2018/017264, filed Feb. 7, 2018.
Weimerskirch, Andre, "Automotive Data Security", SAE 2012 Government/Industry Meeting, Jan. 25, 2012.

* cited by examiner

*Primary Examiner* — Kambiz Zand
*Assistant Examiner* — Benjamin A Kaplan
(74) *Attorney, Agent, or Firm* — Ralph E. Smith

(57) ABSTRACT

A security gateway module for an automotive vehicle is couplable in series between an OBD CAN bus and an internal CAN bus of the vehicle over which electronic devices of the vehicle communicate. The security gateway module checks CAN bus messages received on the OBD CAN bus, determines whether they should be passed to the internal CAN bus, passes those that it determines should be passed and does not pass those it determines should not be passed.

14 Claims, 4 Drawing Sheets

SECURITY GATEWAY MODULE FOR ON-BOARD DIAGNOSTICS PORT OF A VEHICLE

The present invention relates to automotive vehicles having an on-board diagnostics port, and more particularly, to a security gateway for the on-board diagnostics port.

BACKGROUND

Modern automotive vehicles have an on-board diagnostics ("OBD") port coupled to one or more data communication buses of the vehicle, which are typically controller area network ("CAN") buses. As is known in the art, CAN is a multi-master serial bus standard for connecting electronic devices, typically electronic control units ("ECUs"), which are also known as nodes. In servicing such vehicles, a diagnostic tool is coupled to the OBD port and is used to read out diagnostic codes from the vehicles. In some cases, the diagnostic tool also runs diagnostic routines and/or causes an electronic control unit or other electronic device to run self-diagnostic routines. Since the OBD port is coupled to the CAN bus (or buses) of the vehicle over which electronic devices in the vehicle communicate with each other, the OBD port could be used by a hacker to hack electronic devices in the vehicle, such as altering their programming in an improper manner, introduce malware onto the vehicle, or otherwise compromise security of electronic devices in the vehicle.

SUMMARY

In accordance with an aspect of the present disclosure, an automotive vehicle has a plurality of electronic devices that communicate over at least one internal CAN (controller area network) bus. At least one OBD CAN bus port of a security gateway module is coupled to an on-board diagnostic connector of the vehicle by a corresponding OBD CAN bus. An internal CAN bus port of the security gateway module is coupled to the internal CAN bus. The security gateway module has a data dictionary of CAN_IDs of approved diagnostic CAN bus messages and parameters for each of these CAN_IDs stored in a memory of the security gateway module. The security gateway module has a partial disable mode for each CAN_ID in the data dictionary and a full disable mode. The security gateway module when in the full disable mode configured not to pass any CAN bus messages received over the OBD CAN bus via the OBD CAN bus port to the internal CAN bus via the internal CAN bus port except for any CAN bus message having a CAN_ID that matches a CAN_ID on a white list of CAN_IDs stored in the data dictionary and the security gateway module is not in the partial disable mode for that CAN_ID. The security gateway module when in the partial disable mode for a CAN_ID configured not to pass to the internal CAN bus via the internal CAN bus port a CAN bus message received on the OBD CAN bus that has the CAN_ID for which the security gateway module is in the partial disable mode. The security gateway module configured to pass to the internal CAN bus via the internal CAN bus port a CAN bus message received over the OBD CAN bus via the OBD CAN bus port when that CAN bus message has a CAN_ID that matches one of the CAN_IDs in the data dictionary, the security gateway module is not in the full disable mode and is not in the partial disable mode for that CAN_ID and configured not to pass to the internal CAN bus via the internal CAN bus port a CAN bus message received over the OBD CAN bus via the OBD CAN bus port when that CAN bus message has a CAN_ID that does not match one of the CAN_IDs in the data dictionary. For each CAN bus message received on the OBD CAN bus having a CAN_ID that matches one of the CAN_IDs in the data dictionary, the security gateway module is configured to compare parameters of that CAN bus message with parameters for that CAN_ID stored in the data dictionary and flagging that CAN_ID as having had a partial disable mode violation when the parameters of that CAN bus message are not within each range defined by the parameters in the data dictionary for that CAN_ID. The security gateway module is configured to count a number of violations that each CAN_ID in the data dictionary has had and transitioning to the partial disable mode for a CAN_ID when the number of violations that a CAN_ID has had reached a predetermined number that is one of the parameters for that CAN_ID stored in the data dictionary.

In accordance with an aspect, the security gateway module is configured to detect the following violations of CAN protocol and enter its full disable mode upon detecting the occurrence of any of the following violations: an unknown/incorrect message violation which is a CAN bus message with a CAN-ID that is not among one of the CAN-ID's stored in the data dictionary or with a message length that is outside a message length range defined by parameters for that CAN-ID stored in the data dictionary; a denial of service violation which is receipt by the security gateway module over the OBD CAN bus via the OBD CAN bus port of enough valid CAN bus messages within a given period of time determined based on at least one of the parameters stored in the data dictionary that results in a bus utilization exceeding a threshold determined based on at least one of the parameters stored in the data dictionary; and a CAN burst mode violation which is receipt by the security gateway module over the OBD CAN bus via the OBD CAN bus port of a number of invalid CAN bus messages defined by a parameter stored in the data dictionary within a period of time defined by a parameter stored in the data dictionary.

In accordance with an aspect, the security gateway is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

In accordance with an aspect, the security gateway module is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

In accordance with an aspect, the security gateway module has a restricted state mode for at least one vehicle state. The security gateway module is responsive to a state variable received over the internal CAN bus via the internal CAN bus port and entering its restricted state mode upon the state variable being true indicating that the vehicle is in the at least one vehicle state and exiting its restricted state mode upon the state variable being false indicating that the vehicle is not in the at least one vehicle state. The security gateway module is configured not to pass through to the internal CAN bus via the internal CAN bus port any CAN bus message received on the OBD CAN bus that the security gateway module determines is not appropriate to pass through to the internal CAN bus when the security gateway module is in the restricted state mode based on the CAN_ID of that CAN bus message and when a parameter for that CAN_ID stored in the data dictionary indicates that CAN bus messages having that CAN_ID are not to be passed through to the internal CAN bus via the internal CAN bus port when the security gateway module is in the restricted state mode for the at least one vehicle state. In accordance with an aspect, the security gateway module has a restricted state mode for a plurality of vehicle states wherein the security gateway module responsive to a state variable for each vehicle state received on the internal CAN bus and entering its restricted state mode as to a particular vehicle state upon the state variable for that particular vehicle state being true indicating that the vehicle is in that particular vehicle state and exiting its restricted state mode as to a particular vehicle state upon the state variable for that particular vehicle state being false indicating that the vehicle is not in that particular vehicle state.

In accordance with an aspect, the white list is a null set.

BRIEF DESCRIPTION OF THE DRAWINGS

The present invention will become more fully understood from the detailed description and the accompanying drawings, wherein.

DETAILED DESCRIPTION

Figure 1:
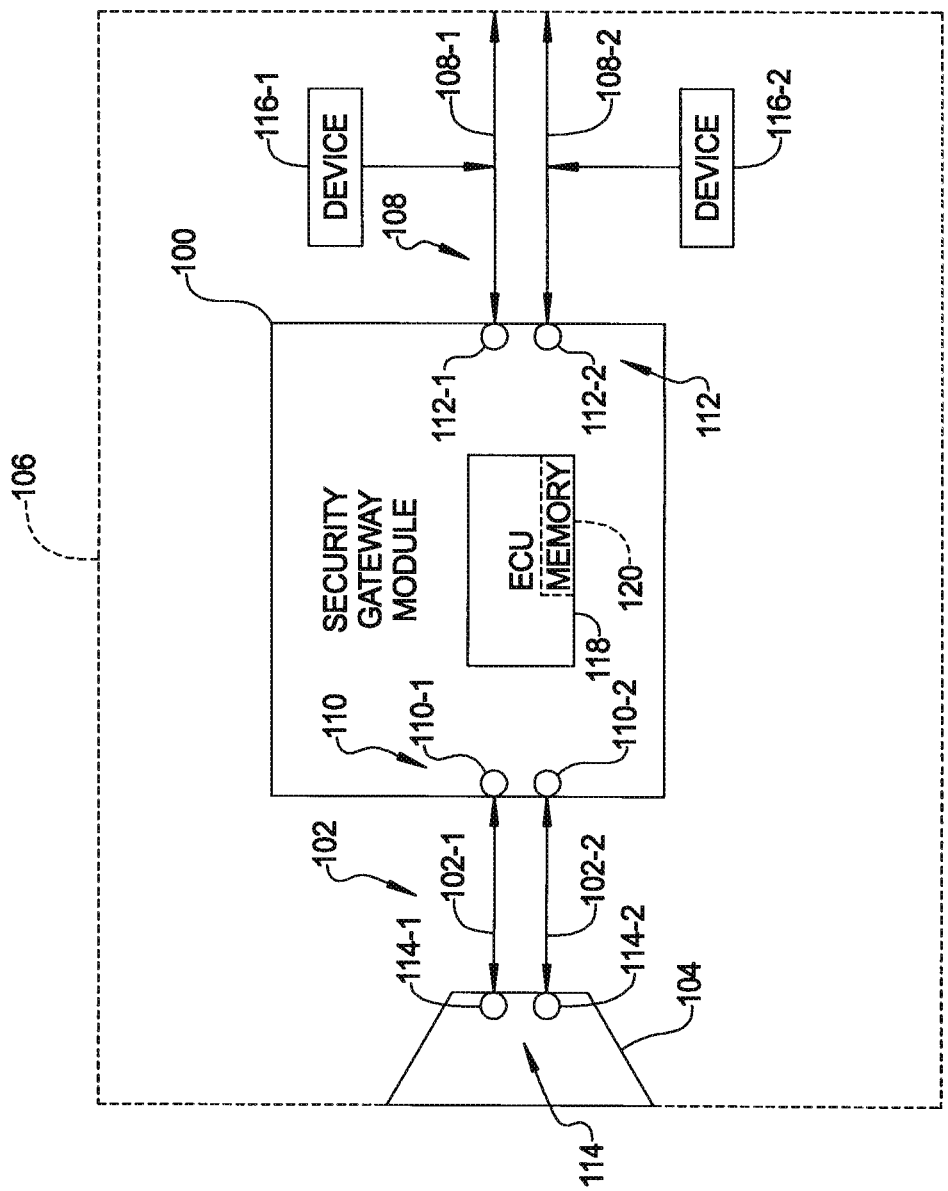
FIG. 1 is a simplified diagram showing a security gateway module in accordance with aspect of the present disclosure connected in series in CAN busses between an OBD port of a vehicle and electronic devices of the vehicle that are connected to the CAN busses.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 2:
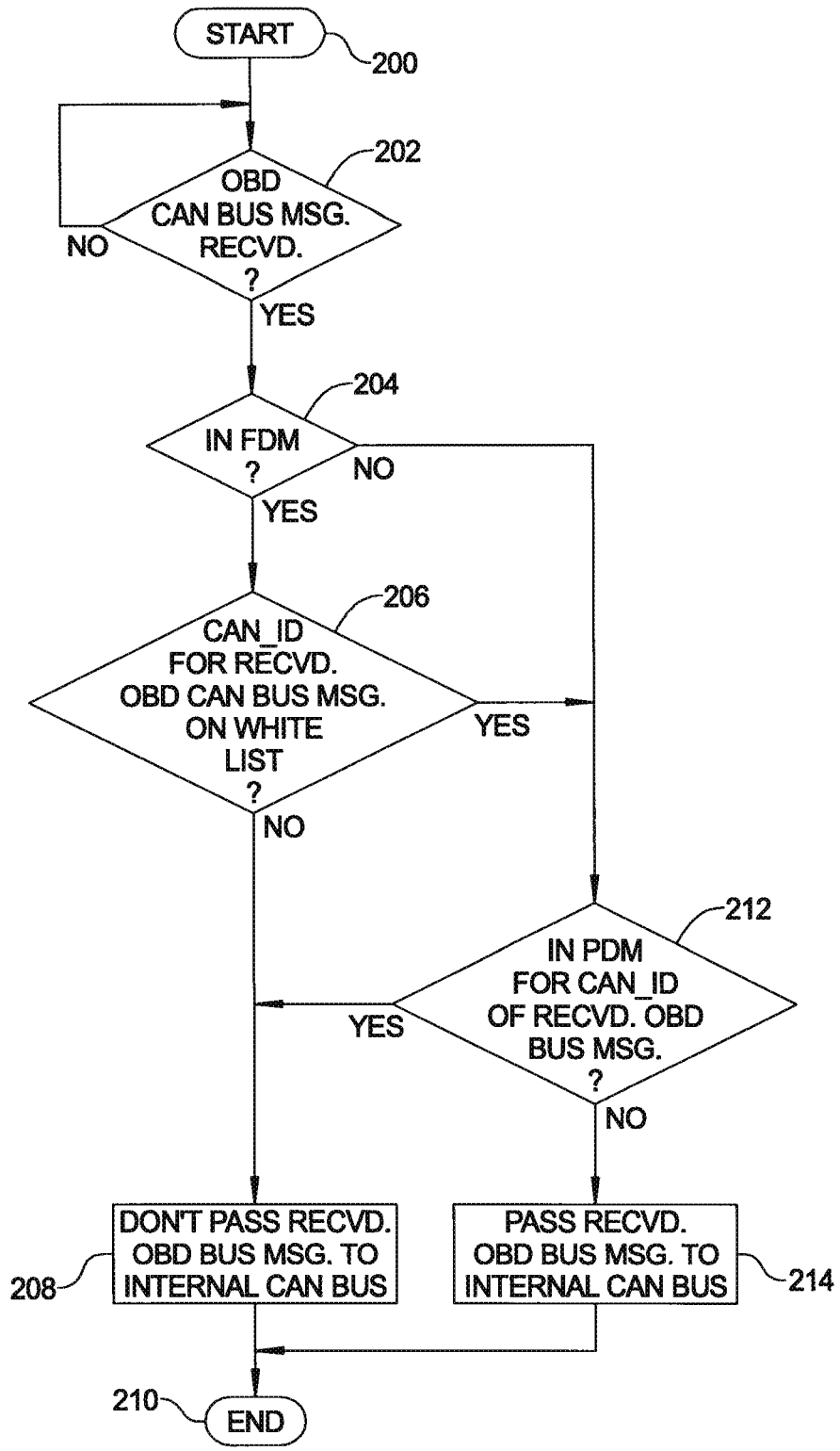
FIGS. 2-4 are illustrative flow charts of control logic for control routines for control of security gateway module of FIG. 1 in accordance with aspects of the present disclosure.

FIG. 1 is a simplified diagram showing a security gateway module 100 in accordance with aspect of the present disclosure connected between one or more CAN buses 102 coupled to an OBD connector 104 of an automotive vehicle 106 and associated internal CAN buses 108 of vehicle 106. CAN buses 102 are referred to herein as OBD CAN buses 102 since they couple OBD connector 104 to security module 100. In the example of FIG. 2 there are two OBD CAN buses 102 (OBD CAN bus 102-1 and 102-2) and two associated internal CAN buses 108 (internal CAN bus 108-1 and internal CAN bus 108-2) all of which are illustratively high speed CAN buses. OBD CAN buses 102 are coupled to OBD CAN bus ports 110 of security gateway module 100 (OBD CAN bus ports 110-1 and 110-2 in the example of FIG. 1) and internal CAN buses 108 are coupled to internal CAN bus ports 112 of security gateway module 100 (internal CAN bus ports 112-1 and 112-2 in the example of FIG. 1). OBD CAN buses 102 are also coupled to CAN bus ports 114 of OBD connector 102 (CAN bus ports 114-1 and 114-2 in the example of FIG. 1). Devices 116 of vehicle 106 that communicate via internal CAN buses 108 are coupled to the applicable CAN bus 108, shown representatively by device 116-1 coupled to internal CAN bus 108-1 and device 116-2 coupled to internal CAN bus 108-2.

Security gateway module 100 includes an electronic control unit referred to herein as ECU 118. ECU 118 is configured with a data dictionary stored in a memory 120 of ECU 118, as described in more detail in Tables 1-3 below. As used herein, the data dictionary includes the approved diagnostic messages for vehicle 106 and parameters for each of these approved diagnostic messages. Security gateway module 100 has a partial disable mode for each CAN_ID in the data dictionary and a full disable mode. When in the full disable mode, the security gateway module is configured not to pass any CAN bus messages received on any OBD CAN bus 102 to any internal CAN bus 108 except for any CAN bus message having a CAN_ID that matches a CAN_ID on a white list of CAN_IDs also stored in the data dictionary and the security gateway module is not in the partial disable mode for that CAN_ID. The CAN_IDs on the white list are a subset of the CAN_IDs of approved diagnostic messages stored in the data dictionary. In an aspect, they are the CAN_IDs for the required diagnostic messages for the particular make/model of vehicle that vehicle 106 is. It should be understood that in an aspect, the white list is a null set. That is, there are no CAN_IDs on the white list.

It should be understood that when it is stated that security gateway module 100 receives a CAN bus message over any OBD CAN bus 108, it does so via the associated OBD CAN bus port 110. Also, when it is stated that security gateway module 100 passes or does not pass a CAN bus message to any internal CAN bus 112, it does so by passing or not passing a CAN bus message to the associated internal CAN bus port 112. Similarly, when it is stated that security gateway module 100 receives a CAN bus message on any internal CAN bus 112, it does so by receiving the CAN bus message on the associated internal CAN bus port 114.

When the security gateway module 100 is in the partial disable mode for a CAN_ID, the security gateway module is configured not to pass to any internal CAN bus 108 a CAN bus message received on any OBD CAN bus 102 that has the CAN_ID for which the security gateway module is in the partial disable mode.

The security gateway module 100 is configured to pass to the applicable internal CAN bus 108 a CAN bus message received on the applicable OBD CAN bus 102 when the CAN bus message has a CAN_ID that matches one of the CAN_IDs in the data dictionary, the security gateway module 100 is not in the full disable mode and is also not in the partial disable mode for that CAN_ID. The security gateway module 100 is configured not to pass to any internal CAN bus a CAN bus message received on any OBD CAN bus 102 when that CAN bus message has a CAN_ID that does not match one of the CAN_IDs in the data dictionary.

For each CAN bus message received on any OBD CAN bus having a CAN_ID that matches one of the CAN_IDs in the data dictionary, the security gateway module is configured to compare parameters of that CAN bus message with parameters for that CAN_ID stored in the data dictionary and flagging that CAN_ID as having had a violation when the parameters of the CAN bus message are not within each range defined by the parameters in the data dictionary for that CAN_ID. The security gateway module is also configured to count a number of violations that each CAN_ID in the data dictionary has had and transitioning to the partial disable mode for a CAN_ID when the number of violations that the CAN_ID has had reaches a predetermined number that is one of the parameters for that CAN_ID stored in the data dictionary.

Security gateway module 100 is configured to detect the following types of violations: Message Dither Violation, Unknown/Incorrect Message Violation, Denial of Service Violation, and CAN Burst Mode Violation. .ECU 118 determines these violations using the following rules.

Message Dither Violation. Receipt of CAN bus messages for a specific CAN-ID within a period faster or slower than an expected period for that CAN-ID. A violation is determined differently for cyclic and non-cyclic CAN bus messages. A cyclic CAN bus message has a violation if the current measured period is less than (Expected Rep Rate−MDV_Fast_Threshold) or larger than (Expected Rep Rate+MDV_Slow Threshold). A non-cyclic CAN bus message has a violation if the current measured period is less than MDV_Fast_Threshold. Each different CAN_ID has a unique MDV_Fast_Threshold and MDV_Slow_Threshold.

Unknown/Incorrect Message Violation. Receipt of a CAN bus message with an invalid CAN-ID which is a CAN-ID not in the data dictionary or receipt of an incorrect CAN bus message which is a CAN bus message having a valid CAN-ID but an incorrect data length for that CAN-ID.

Denial of Service Violation. Receipt of enough valid CAN bus messages that force a simple bus utilization calculation to exceed DOSV_Bus_Util_Threshold % for DOSV_Active_Time_Threshold seconds. This simple bus utilization calculation is total CAN bytes received per second divided by a CAN baud rate for the applicable OBD CAN bus 102.

CAN Burst Mode Violation. Flood of invalid CAN bus messages that cause a CAN node receiver of a device coupled to the CAN bus on which the CAN bus messages are being communicated to enter the Receiver Warning State or the Receiver Error Passive State. A violation is logged if the Receiver Warning State is active for CBMV_Rec_Warn_Time_Threshold. A violation is also logged if the Receiver Error Passive State is active for CBMV_Rec_Err_Pass_Time_Threshold milliseconds. A Bus Off condition results in a violation being logged immediately.

Message in Restricted State. Receipt by the security gateway module 100 on any internal CAN bus 108 of one or more of a predefined set of CAN bus messages that trigger security gateway module 100 to enter a Restricted State as to an applicable approved diagnostic message. When in the Restricted State as to an applicable approved diagnostic message, the security gateway module 100 does not pass a CAN bus message received on any OBD CAN bus 102 that has the CAN_ID of that applicable approved diagnostic message to which the Restricted State applies. The predefined set of CAN bus messages are CAN bus messages indicative of vehicle states where as to any applicable approved diagnostic message the vehicle is not in a state that is valid for that approved diagnostic message, as discussed in more detail below. Once the security gateway module 100 enters the Restricted State as to an applicable approved diagnostic message due to the vehicle being in a state that is not valid for that applicable approved diagnostic message, the security gateway module remains in the Restricted State as to that applicable approved diagnostic message until the vehicle state changes to a state that is valid for that applicable approved diagnostic message and the security gateway module receives a message to that effect on any internal CAN bus 108. In this regard, the Restricted State is a partial disable mode as to CAN bus messages having the CAN_ID for which the security gateway module 100 is in the Restricted State.

An example illustrating the Restricted State is discussed with reference to a brake bleed approved diagnostic message. In some vehicles, a mechanic replacing brake pads of the vehicle can use a diagnostic tool coupled to the OBD port of the vehicle to command the power brakes to be applied to bleed the brakes. In such case, the engine of the vehicle is in running and should be in park. The diagnostic tool sends a brake bleed diagnostic message that is sent via the OBD port onto the appropriate internal CAN bus 108. The power brake control module coupled to that CAN bus responds to the brake bleed diagnostic message by applying the power brakes. In this example, the vehicle state where it is valid to send the brake bleed diagnostic message onto the vehicle side facing CAN bus is when the vehicle is in park. If the vehicle is not in park, then the vehicle is in a state where it is not valid to send the brake bleed diagnostic message onto any internal CAN bus 108.

In an example, security gateway gateway module 100 goes into the partial disable mode for any particular CAN_ID when the number of Message Dither Violations for that CAN_ID equals or exceeds the MDV_Count_Threshold for that CAN_ID.

In an example, security gateway module 100 goes into the full disable mode if any of the following occurs: An Unknown Message Violation; a Current Denial of Service event remains active for at least DOSV_Active_Time_Threshold seconds; or a CAN Burst Mode Violation occurs. Once security gateway module 100 is in the full disable mode, it remains in the full disable mode until a reset condition occurs which resets it unless it was a CAN Burst Mode Violation that caused security gateway module 100 to go into the full disable mode. The reset condition is illustratively determined based on the implementation of the security gateway module such as for the particular vehicle model. If a CAN Burst Mode Violation caused security gateway module 100 to go into the full disable mode, security gateway module 100 resets from the full disable mode to normal operation after an ignition cycle. The It should be understood that the OBD CAN buses 102 and the internal CAN buses 108 are the same CAN buses before the security gateway module 100 is installed. That is, the vehicle's CAN buses connected to the OBD connector 104 are disconnected from the OBD connector 104 and the security gateway module 100 installed in series in these CAN buses so that the OBD CAN buses 102 connect the security gateway module 100 to the OBD connector 104 and the vehicle's internal CAN buses 108 connect the security gateway module to electronic devices of vehicle 106 that communicate over the vehicle's internal CAN buses.

It should also be understood that the information stored in the data dictionary for a security gateway module are the CAN_IDs for the approved OBD diagnostic messages for the make/model of vehicle that vehicle 106 is and associated parameters.

As used herein, the following terms mean:

"Bus Off" is any state in which the CAN bus does not function for communication due to a cessation of correct electrical conditions for operation. Such conditions may be a switched connection opening the circuit to power or ground as well as other methods used in the industry.

"CAN frame" is a fixed segment of data defined by the chosen CAN Protocol as a basic unit of communication. Each CAN frame is "framed" with bits used as semaphores in the communication protocol to ensure successful communication of the frame. If the message carried on the frame is shorter than the specified segment length padding will be added.

"CAN bus message" is a defined collection of data "signals" each of which are single codified pieces of information, exchanged between nodes.

"Cyclic CAN bus message" is a defined collection of data "signals" each of which are single codified pieces of information, exchanged between nodes.

"Cyclic Rep. Rate" is rate at which a cyclical CAN bus message is repeated.

"Expected Rep. Rate" is a predefined and fixed message rate for each Cyclic CAN bus message.

"FDM" is full disable mode.

"Non-cyclic CAN bus message" is a CAN bus message transmitted upon the fulfillment of defined event conditions within the logic of the transmitting ECU.

"PDM" is partial disable mode.

"OBD" is onboard diagnostic.

"Receiver Warning State" is a state of communication induced by errors in received frames where the node still participates in bus communications but also sends an error frame.

"Receiver Error Passive State" is a state of communication induced by errors in received frames where the node still participates in bus communications but also sends an error frame.

"SGM" is security gateway module (such as security gateway module 100).

"NVM" is non-volatile memory.

The CAN bus message Configuration Values are the following values containing the following information set forth in Table 1 for each CAN_ID in the data dictionary:

TABLE 1

CAN Bus Message Configuration Values

| Name | Description |
| --- | --- |
| CAN_ID | The arbitration ID per the CAN bus standard (ISO 11898 et seq.) which is a unique value for each particular type of CAN bus message. |
| Rep. Rate | Message Rep. Rate (msec) from the data dictionary. A value of zero is used for non-cyclic (one-shot) messages. |
| MDV_Count_Threshold | Number of Message Dither Violations during an IGN cycle that cause the SGM to enter PDM for the offending CAN_ID. |
| MDV_Fast_Threshold | Number of milliseconds that the message may be received faster than the Cyclic Rep. Rate. A Message Dither Violation has occurred if the message is received faster than (Rep Rate − MDV_Fast_Threshold). |
| MDV_Slow_Threshold | Number of milliseconds that the message may be received slower than the Cyclic Rep. Rate. A Message Dither Violation has occurred if the message is received slower than (Rep Rate + MDV_Slow_Threshold). This value is not used if the Rep. Rate equals zero (non-cyclic message). |
| PDM | A value of 0 denotes the CAN ID is to be forwarded. A value of 1 denotes the CAN_ID is in PDM and is not to be forwarded. |
| Restricted_State_Variables | Set of state variables for vehicles state. If a state variable for a vehicle state is true, the SGM enters the restricted state as to that vehicle state. |
| Restricted_State_whitelist | List of CAN_IDs allowed from the OBD connector while the vehicle is operating in the restricted state. This list is the OBD required diagnostics for the particular vehicle. |

The Configuration and Threshold Detection Values are the following values containing the following information set forth in Table 2 that are applicable to all CAN_IDs.

TABLE 2

Configuration and Threshold Detection Value

| Name | Description |
| --- | --- |
| DOSV_Bus_Util_Threshold | Bus utilization threshold value required for a Denial of Service Violation. The calculation for bus utilization is total CAN bytes received per second/CAN baud rate. |
| DOSV_Active_Time_Threshold | Number of seconds that the current bus utilization must be above DOSV_Bus_Util_Threshold in order to flag a Denial of Service Violation and cause the SGM to enter FDM. |

TABLE 2-continued

Configuration and Threshold Detection Value

| Name | Description |
|---|---|
| CBMV_Rec_Warn_Time_Threshold | Amount of time in milliseconds that the CAN node receiver must be in the "Receiver Warning State" to cause a "CAN Burst Mode Violation". |
| CBMV_Rec_Err_Pass_Time_Threshold | Amount of time in milliseconds that the CAN node receiver must be in the "Receiver Error Passive State" to cause a "CAN Burst Mode Violation". |
| CBMV_Heal_Time | Amount of time in milliseconds that the SGM CAN receiver node must be in "No Warning/Error State" in order to exit an FDM state caused by a CAN Burst Mode Violation. |
| SGM_CAN_Settle_Time | Number of milliseconds after an IGN On event that the SGM begins monitoring Message Dither, Denial of Service, and CAN Burst Mode Violations |

The Logging Values are the following values containing the following information set forth in Table 3 below.

TABLE 3

Logging Values

| Name | Memory Type | Description |
|---|---|---|
| UMV_Total_Count | NVM | Total number of Unknown Message Violations. |
| DOSV_Total_Count | NVM | Total number of Denial of Service Violations. |
| CBMV_Total_Count | NVM | Total number of CAN Burst Mode Violations. |
| MDV_Total_Count | NVM | Total number of Message Dither Violations. |
| IGN_Cycle_Count | NVM | Total number of IGN Cycles during operation. The value is incremented on every transition from IGN Off to IGN On. |
| Current_IGN_ON_Time | NVM | Milliseconds since last IGN On event. |

FIG. 2 is a flow chart of control logic for an illustrative control routine by which security gateway module 100 is controlled by ECU 118 to determine whether to pass a CAN bus message received on any OBD CAN bus 102 to any internal CAN bus 108. A CAN bus message received by security gateway module 100 on any OBD CAN bus 102 is referred to herein as an OBD CAN bus message. The control routine starts at 200 and at 202 determines whether an OBD CAN bus message was received. If not, the control routine branches back to 202. If at 202 an OBD CAN bus message was received, the control routine proceeds to 204 where it checks whether security gateway module 100 is in the full disable mode. If so, the control routine proceeds to 206 and if not, the control routine proceeds to 212. At 206, the control routine checks if the CAN_ID of the received OBD CAN bus message is on the white list. If so, the control routine proceeds to 208 and if not, the control routine proceeds to 212. At 208, the control routine does not pass the received OBD CAN bus message to any internal CAN bus 108 and then proceeds to 210 where it ends. When control routine has proceeded to 212, the control routine checks whether the gateway way security module is in the partial disable mode as to the CAN_ID of the received OBD CAN bus message. If so, the control routine branches to 208 and if not, the control routine proceeds to 214 where it passes the received OBD CAN bus message to the applicable internal CAN bus 108.

Figure 3:
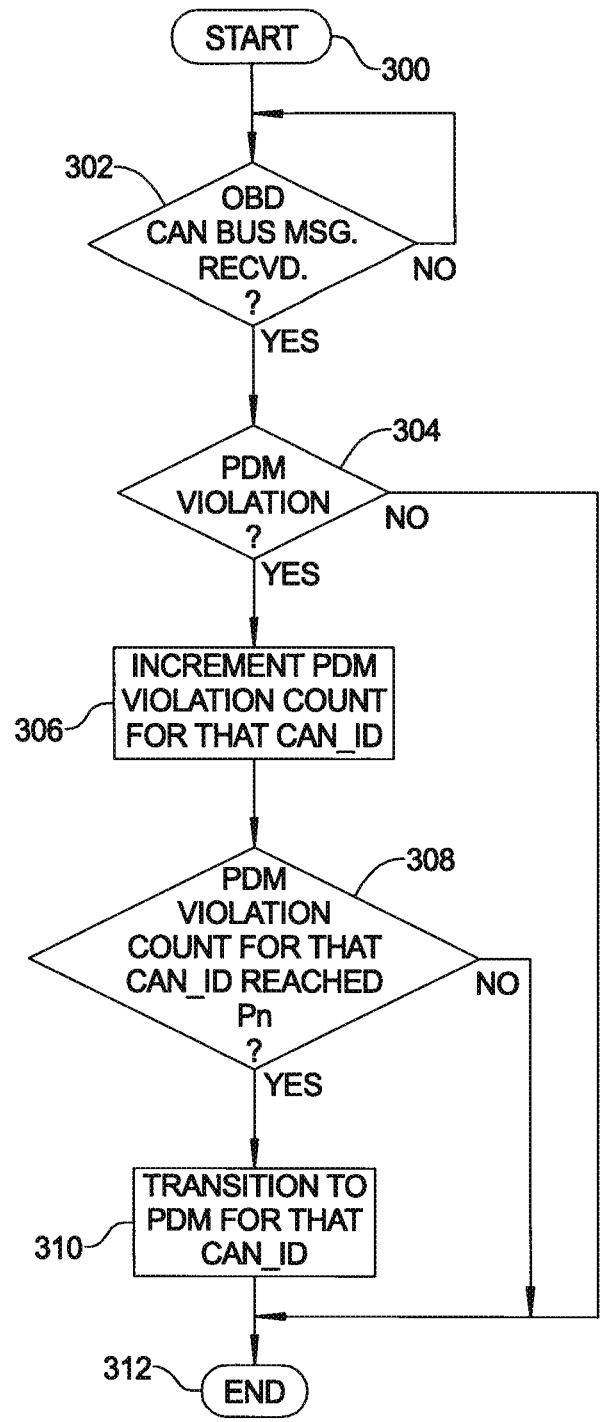

FIG. 3 is a flow chart of control logic for an illustrative control routine by which security gateway module 100 is controlled by ECU 118 to determine whether to transition to the partial disable mode as to a CAN_ID. The control routine starts at 300 and at 302 checks whether an OBD CAN bus message was received. If not, the control routine branches back to 302 and if so, the control routine proceeds to 304. At 304, the control routine checks if the received OBD CAN bus message is a PDM violation. That is, whether the received OBD CAN bus message is flagged a partial disable mode violation as discussed above. If so, the control routine proceeds to 306 and if not, the control routine proceeds to 312 where it ends. At 306, the control routine increments a PDM violation count for that CAN_ID and at 308, checks whether the PDM violation count for that CAN_ID has reached a predetermined number (Pn). If not, the control routine proceeds to 312. If so, the control routine proceeds to 310 where it transitions security gateway module 100 to the partial disable mode as to that CAN_ID and then proceeds to 312.

Figure 4:
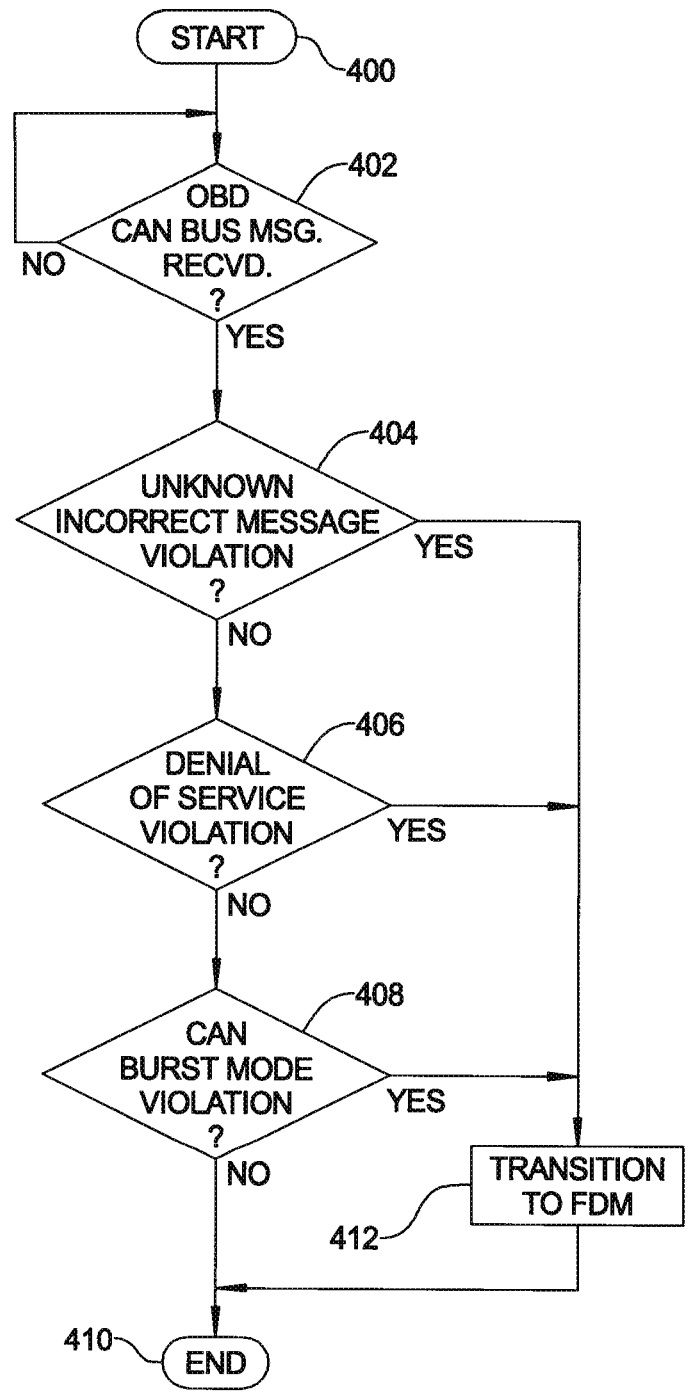

FIG. 4 is a flow chart of control logic for an illustrative control routine by which security gateway module 100 is controlled by ECU 118 to determine whether to transition to the full disable mode. The control routine starts at 400 and at 402 checks whether an OBD CAN bus message was received. If not, the control routine branches back to 402 and if so, the control routine proceeds to 404. At 404, the control routine checks whether there is an unknown/incorrect message violation, as discussed above. If not, the control routine proceeds to 406 and if so, the control routine proceeds to 412. At 406, the control routine checks whether there is a denial of service violation, as discussed above. If not, the control routine proceeds to 408 and if so, the control routine proceeds to 412. At 408, the control routine checks whether there is a CAN burst mode violation, as discussed above. If not, the control routine proceeds to 410 where it ends and if so, the control routine proceeds to 412. At 412, the control routine transitions security gateway module 100 to the full disable mode and then proceeds to 410 where it ends.

It should be understood that the above described control routine(s) are implemented in ECU 118 and when it is stated that security gateway module performs a function or is configured to perform a function, ECU 118 of security gateway module 100 has control logic to control security gateway module 100 to perform the function (such as in software programmed in ECU 118, k logic devices, or a combination thereof). It should be understood that ECU 118 is or includes any of a digital signal processor (DSP), microprocessor, microcontroller, or other programmable device which is programmed with software implementing the above described control routine(s). It should be understood that alternatively ECU 118 is or includes other logic devices, such as a Field Programmable Gate Array (FPGA), a complex programmable logic device (CPLD), or application specific integrated circuit (ASIC).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle, comprising:
   a plurality of electronic devices that communicate over at least one internal controller area network ("CAN") bus;
   a security gateway module coupled to an on-board diagnostic connector by at least one OBD CAN bus, the security gateway module coupled to the internal CAN bus;
   the security gateway module having a data dictionary of CAN_IDs of approved diagnostic CAN bus messages and parameters for each of these CAN_IDs stored in a memory of the security gateway module;
   the security gateway module having a partial disable mode for each CAN_ID in the data dictionary and a full disable mode;
   the security gateway module when in the full disable mode configured not to pass any CAN bus messages received on the OBD CAN bus to the internal CAN bus except for any CAN bus message having a CAN_ID that matches a CAN_ID on a white list of CAN_IDs stored in the data dictionary and the security gateway module is not in the partial disable mode for that CAN_ID, wherein the CAN ID's on the white list are a subset of the CAN_ID's in the data dictionary; and
   the security gateway module when in the partial disable mode for a CAN_ID configured not pass to the internal CAN bus a CAN bus message received on the OBD CAN bus that has the CAN_ID for which the security gateway module is in the partial disable mode;
   the security gateway module configured to pass to the internal CAN bus a CAN bus message received on the OBD CAN bus when that CAN bus message has a CAN_ID that matches one of the CAN_IDs in the data dictionary, the security gateway module is not in the full disable mode and is not in the partial disable mode for that CAN_ID and configured not to pass to the internal CAN bus a CAN bus message when the CAN bus message has a CAN_ID that does not match one of the CAN_IDs in the data dictionary; and
   for each CAN bus message received on the OBD CAN bus having a CAN_ID that matches one of the CAN_IDs in the data dictionary, the security gateway module configured to compare parameters of that CAN bus message with parameters for that CAN_ID stored in the data dictionary and flagging that CAN_ID as having had a violation when the parameters of the CAN bus message are not within each range defined by the parameters in the data dictionary for that CAN_ID; and
   the security gateway module configured to count a number of violations that each CAN_ID in the data dictionary has had and transitioning to the partial disable mode for a CAN_ID when the number of violations that a CAN_ID has had reaches a predetermined number that is one of the parameters for that CAN_ID stored in the data dictionary.

2. The automotive vehicle of claim 1 wherein the security gateway module is configured to detect the following violations of CAN protocol and enter its full disable mode upon detecting the occurrence of any of the following violations:
   an unknown/incorrect message violation which is a CAN bus message with a CAN-ID that is not among one of the CAN-ID's stored in the data dictionary or with a message length that is outside a message length range defined by parameters for that CAN-ID stored in the data dictionary;
   a denial of service violation which is receipt by the security gateway module on the OBD CAN bus of enough valid CAN bus messages within a given period of time determined based on at least one of the parameters stored in the data dictionary that results in a bus utilization exceeding a threshold determined based on at least one of the parameters stored in the data dictionary; and
   a CAN burst mode violation which is receipt by the security gateway module on the OBD CAN bus of a number of invalid CAN bus messages defined by a parameter stored in the data dictionary within a period of time defined by a parameter stored in the data dictionary.

3. The automotive vehicle of claim 2 wherein the security gateway is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

4. The automotive vehicle of claim 1 wherein the security gateway module is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

5. The automotive vehicle of claim 1 wherein the security gateway module has a restricted state mode for at least one vehicle state, the security gateway module is responsive to a state variable received on the internal CAN bus and entering its restricted state mode upon the state variable being true indicating that the vehicle is in the at least one vehicle state and exiting its restricted state mode upon the state variable being false indicating that the vehicle is not in the at least one vehicle state, wherein the security gateway module is configured not to pass through to the internal CAN bus any CAN bus message received on the OBD CAN bus that the security gateway module determines is not appropriate to pass through to the internal CAN bus when the security gateway module is in the restricted state mode based on the CAN_ID of that CAN bus message and when a parameter for that CAN_ID stored in the data dictionary indicates that CAN bus messages having that CAN_ID are not to be passed through to the internal CAN bus when the security gateway module is in the restricted state mode for the at least one vehicle state.

6. The automotive vehicle of claim 5 wherein the security gateway module has a restricted state mode for a plurality of vehicle states wherein the security gateway module is responsive to a state variable for each vehicle state received on the internal CAN bus and entering its restricted state mode as to a particular vehicle state upon the state variable for that particular vehicle state being true indicating that the vehicle is in that particular vehicle state and exiting its restricted state mode as to a particular vehicle state upon the state variable for that particular vehicle state being false indicating that the vehicle is not in that particular vehicle state, wherein the security gateway module is configured not to pass through to the internal CAN bus any CAN bus message received on the OBD CAN bus that the security gateway module determines is not appropriate to pass through to the internal CAN bus when the security gateway module is in the restricted state mode as to a particular vehicle state based on the CAN_ID of that CAN bus message and when a parameter for that CAN_ID stored in the data dictionary indicates that CAN bus message having that CAN_ID are not to be passed through to the internal CAN bus when the security gateway module is in the restricted state mode as to that particular vehicle state.

7. The automotive vehicle of claim 1 wherein the white list is a null set.

8. A security gateway module for an automotive vehicle, the automotive vehicle having a plurality of electronic devices that communicate over at least one internal controller areas network ("CAN") bus, the automotive vehicle having an on-board diagnostic connector;
the security gateway module having at least one internal CAN bus port couplable to the at least one internal CAN bus and at least one OBD can bus port couplable by an OBD CAN bus to the on-board diagnostic connector;
the security gateway module having a data dictionary of CAN_IDs of approved diagnostic CAN bus messages and parameters for each of these CAN_IDs stored in a memory of the security gateway module;
the security gateway module having a partial disable mode for each CAN_ID in the data dictionary and a full disable mode;
the security gateway module when in the full disable mode configured not to pass any CAN bus messages received on the OBD CAN bus port to the internal CAN bus port except for any CAN bus message having a CAN_ID that matches a CAN_ID on a white list of CAN_IDs stored in the data dictionary and the security gateway module is not in the partial disable mode for that CAN_ID, wherein the CAN_ID's on the white list are a subset of the CAN_ID's in the data dictionary; and
the security gateway module when in the partial disable mode for a CAN_ID configured not pass to the internal CAN bus port a CAN bus message received on the OBD CAN bus that has the CAN_ID for which the security gateway module is in the partial disable mode;
the security gateway module configured to pass to the internal CAN bus port a CAN bus message received on the OBD CAN bus port when that CAN bus message has a CAN_ID that matches one of the CAN_IDs in the data dictionary, the security gateway module is not in the full disable mode and is not in the partial disable mode for that CAN_ID and configured not to pass to the internal CAN bus port a CAN bus message when the CAN bus message has a CAN_ID that does not match one of the CAN_IDs in the data dictionary; and
for each CAN bus message received on the OBD CAN bus having a CAN_ID that matches one of the CAN_IDs in the data dictionary, the security gateway module configured to compare parameters of that CAN bus message with parameters for that CAN_ID stored in the data dictionary and flagging that CAN_ID as having had a violation when the parameters of the CAN bus message are not within each range defined by the parameters in the data dictionary for that CAN_ID; and
the security gateway module configured to count a number of violations that each CAN_ID in the data dictionary has had and transitioning to the partial disable mode for a CAN_ID when the number of violations that a CAN_ID has had reaches a predetermined number that is one of the parameters for that CAN_ID stored in the data dictionary.

9. The security gateway module of claim 8 wherein the security gateway module is configured to detect the following violations of CAN protocol and enter its full disable mode upon detecting the occurrence of any of the following violations:
an unknown/incorrect message violation which is a CAN bus message with a CAN-ID that is not among one of the CAN-ID's stored in the data dictionary or with a message length that is outside a message length range defined by parameters for that CAN-ID stored in the data dictionary;
a denial of service violation which is receipt by the security gateway module on the OBD CAN bus port of enough valid CAN bus messages within a given period of time determined based on at least one of the parameters stored in the data dictionary that results in a bus utilization exceeding a threshold determined based on at least one of the parameters stored in the data dictionary; and
a CAN burst mode violation which is receipt by the security gateway module on the OBD CAN bus port of a number of invalid CAN bus messages defined by a parameter stored in the data dictionary within a period of time defined by a parameter stored in the data dictionary.

10. The security gateway module of claim 9 wherein the security gateway is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

11. The security gateway module of claim 8 wherein the security gateway module is configured to detect message dither violations for each CAN_ID in the data dictionary and enter its partial disable mode as to any of the CAN_IDs in the data dictionary when that CAN_ID has had a number of message dither violations defined by a parameter stored in the data dictionary for that CAN_ID where a message dither violation is a cyclic CAN bus message having a CAN_ID where a period of that cyclic CAN bus message does not match a period for that CAN_ID defined by a parameter for that CAN_ID stored in the data dictionary.

12. The security gateway module of claim 8 wherein the security gateway module has a restricted state mode for at least one vehicle state, the security gateway module is responsive to a state variable received on the internal CAN bus port and entering its restricted state mode upon the state variable being true indicating that the vehicle is in the at least one vehicle state and exiting its restricted state mode upon the state variable being false indicating that the vehicle is not in the at least one vehicle state, wherein the security gateway module is configured not to pass through to the internal CAN bus port any CAN bus message received on the OBD CAN bus that the security gateway module determines is not appropriate to pass through to the internal CAN bus port when the security gateway module is in the restricted state mode based on the CAN_ID of that CAN bus message and when a parameter for that CAN_ID stored in the data dictionary indicates that CAN bus messages having that CAN_ID are not to be passed through to the internal CAN bus port when the security gateway module is in the restricted state mode for the at least one vehicle state.

13. The security gateway module of claim 12 wherein the security gateway module has a restricted state mode for a plurality of vehicle states wherein the security gateway module is responsive to a state variable for each vehicle state received on the internal CAN bus port and entering its restricted state mode as to a particular vehicle state upon the state variable for that particular vehicle state being true indicating that the vehicle is in that particular vehicle state and exiting its restricted state mode as to a particular vehicle state upon the state variable for that particular vehicle state being false indicating that the vehicle is not in that particular vehicle state, wherein the security gateway module is configured not to pass through to the internal CAN bus port any CAN bus message received on the OBD CAN bus port that the security gateway module determines is not appropriate to pass through to the internal CAN bus port when the security gateway module is in the restricted state mode as to a particular vehicle state based on the CAN_ID of that CAN bus message and when a parameter for that CAN_ID stored in the data dictionary indicates that CAN bus message having that CAN_ID are not to be passed through to the internal CAN bus port when the security gateway module is hi the restricted state mode as to that particular vehicle state.

14. The security gateway module of claim 8 wherein the white list is a null set.

* * * * *